(12) United States Patent
Enomoto (10) Patent No.: US 6,626,285 B2
(45) Date of Patent: Sep. 30, 2003

(54) COLLAPSIBLE CHIP CONVEYER (75) Inventor: Yukio Enomoto, Kakamigahara (JP)

(73) Assignee: Enomoto Industry Co., Ltd., Gifu (JP)

( * ) Notice: Subject to any disclaimer, the term of this patent is extended or adjusted under 35 U.S.C. 154(b) by 0 days.

(21) Appl. No.: 10/153,283

(22) Filed: May 22, 2002

(65) Prior Publication Data

US 2002/0179420 A1 Dec. 5, 2002

(30) Foreign Application Priority Data

May 31, 2001 (JP) ........................ 2001-165428

(51) Int. Cl.⁷ ................ B65G 21/14; B65G 19/04; B23Q 11/02
(52) U.S. Cl. ............... 198/860.5; 198/861.2; 198/581; 409/137; 82/52
(58) Field of Search ............ 198/861.5, 860.5, 198/861.2, 581; 409/137; 82/52

(56) References Cited

FOREIGN PATENT DOCUMENTS

| DE | 36 25 297 | 2/1988 | ........... B65G/21/14 |
|---|---|---|---|
| EP | 0 063 315 | 10/1982 | ........... B23Q/11/00 |
| EP | 1104745 A1 * | 6/2001 | ........... B65G/21/22 |
| EP | 1262276 A2 * | 12/2002 | ........... B23Q/11/00 |
| GB | 1 563 474 | 3/1980 | ........... B65G/21/10 |
| JP | 63-13639 | 1/1988 | ........... B23Q/11/00 |
| JP | 3-32546 * | 2/1991 | ........... B23Q/11/00 |
| JP | 8-40526 * | 2/1996 | ........... B65G/21/00 |

* cited by examiner

Primary Examiner—Christopher P. Ellis
Assistant Examiner—Mark A. Deuble
(74) Attorney, Agent, or Firm—Synnestvedt & Lechner LLP (57) ABSTRACT A collapsible chip conveyer includes a conveying member having a forwarding portion and a return portion. The conveying member receives chips discharged from a machining tool at a receiving position set on the forwarding portion, conveys the chips to a discharge position, which is located on the forward portion and spaced from the receiving position by a predetermined distance, and discharges the chips from the discharge position. The conveying member has a guide rail, a frame, and a hinge mechanism. Also, the conveying member includes a plurality of separation portions, each of which includes a part of the guide rail and a part of the frame. The hinge mechanism has a rotation axis, which is located between the forwarding portion and the return portion, and couples the separation portions such that the separation portions pivots about the rotation axis between a collapsed position and an opened position. When at the opened position, the separation portions contact each other at one side of the hinge mechanism while forming a gap at the other side. A cover is detachably mounted on the frame to cover the gap. The cover is disengaged from the gap when the separation portion are in a collapsed position.

16 Claims, 8 Drawing Sheets

COLLAPSIBLE CHIP CONVEYER

BACKGROUND OF THE INVENTION

The present invention relates to a chip conveyer for conveying chips having cutting oil generated during machining operation of a machine tool such as a lathe from a receiving position to a discharge position, and in particular, the present invention relates to a collapsible chip conveyer.

As a conventional collapsible chip conveyer, there has been proposed a technique disclosed in Japanese Laid-Open Utility Model Publication No. Sho 63-13639. In this chip conveyer, a conveyer frame includes a horizontal frame member and an inclined frame member. The frame members are coupled to each other at a connection portion by a hinge mechanism. The hinge mechanism permits the inclined frame member to pivot relative to the horizontal frame member. At the time of installation or maintenance/checkup of the chip conveyer, the inclined frame member is pivoted.

The hinge mechanism mutually stacks a right plate and a left plate of the horizontal frame member and a left plate and a right plate of the inclined frame member and connect them such that they can be rotated around a common rotation center axis, which is arranged at a midpoint between the forwarding side (forwarding portion) and the returning side (return portion) of an endless conveying member.

However, in the conventional collapsible chip conveyer, the horizontal frame member and the inclined frame member are connected in a partially overlapping state, and hence, the horizontal frame member and the inclined frame member should have different width values, respectively. This complicates a manufacturing process, and increases a material cost because the width of one frame increases.

Moreover, in the conventional chip conveyer, in order to allow the inclined frame member to pivot, chip guides located at the right and left upper ends of the horizontal frame member and guide rails for guiding the conveying member are partially removed to form a gap. The inner structure of the conveyer is exposed at the gap. This deteriorates the appearance and disturbs smooth rotation of the conveying member due to the discontinuation of the guide rails. Especially when designing a chip conveyer that permits the inclined frame member to be collapsed in a substantially parallel state with respect to the horizontal frame member, relatively great parts of the guide and the guide rails need be removed, which forms a relatively wide gap and makes the aforementioned problems remarkable.

SUMMARY OF THE INVENTION

It is therefore an object of the present invention to provide a collapsible chip conveyer having an improved appearance that is easily collapsed, packed, carried, inspected, installed, and produced at a low cost.

To achieve the foregoing and other objectives and in accordance with the purpose of the present invention, a collapsible chip conveyer having a frame, a guide rail, and an endless conveying member is provided. The conveying member has a forwarding portion and a return portion and travels along the guide rail in the frame. The conveying member receives chips discharged from a machining tool at a receiving position set on the forwarding portion, conveys the chips to a discharge position, and then discharges the chips from the discharge position. The conveyer includes a plurality of separation portions, a hinge mechanism, and a cover. Each of the separation portions includes a part of the guide rail and a part of the frame. The hinge mechanism has a rotation axis, which is located between the forwarding portion and the return portion of the conveying member. The hinge mechanism couples two separation portions such that the coupled separation portions pivot about the rotation axis between a collapsed position and an opened position. The cover is detachably mounted on the frame. When the coupled separation portions are located at the opened position, the coupled separation portions contact each other at one of the forwarding portion and the return portion of the conveying member while forming a gap at the other portion, and the cover covers the gap. When the coupled separation portions are located at the collapsed position, the cover is detached from the frame.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A collapsible chip conveyer according to one embodiment of the present invention will now be described with reference to FIGS. 1 to 11.

Figure 1:
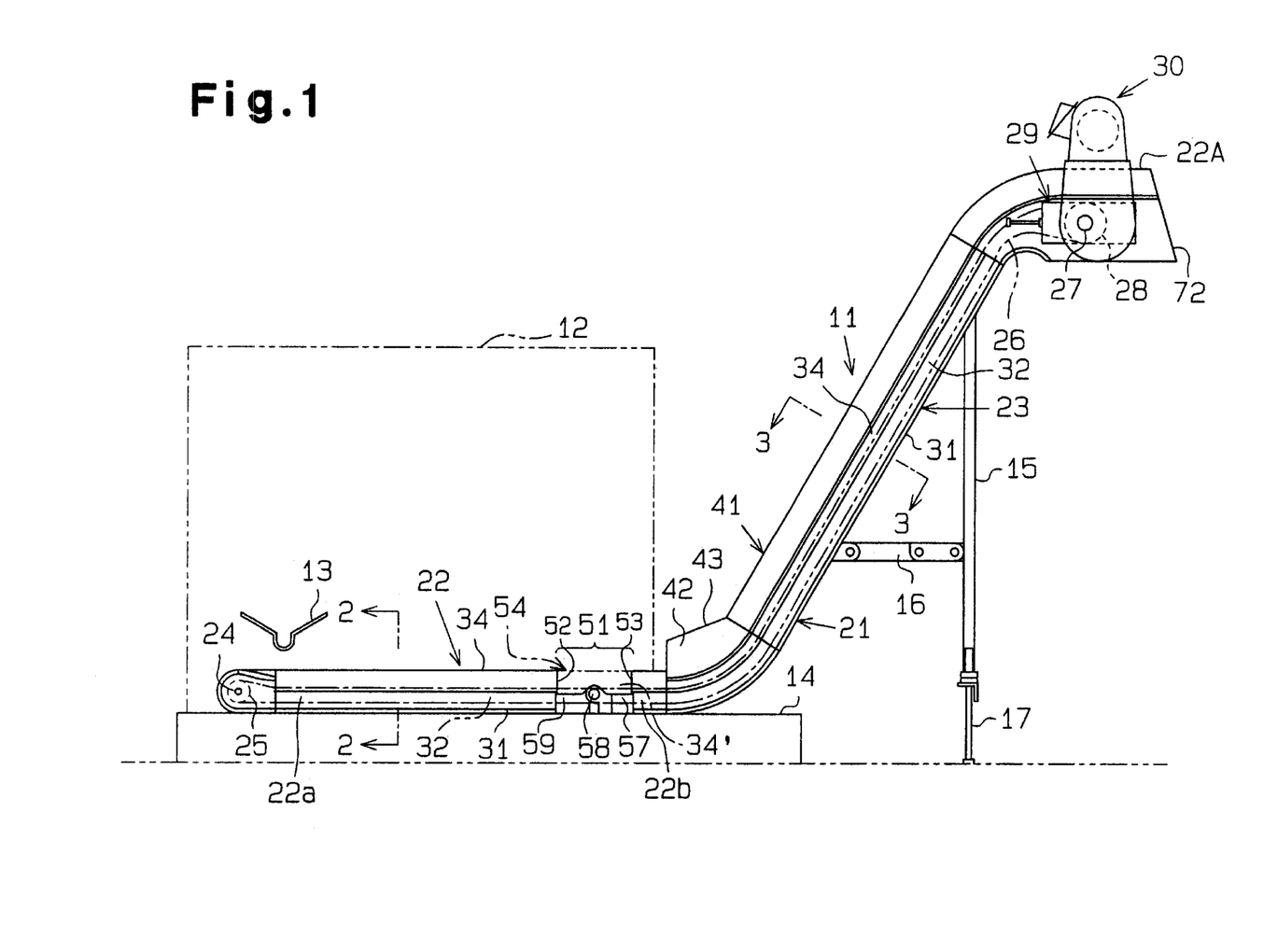
FIG. 1 is a front view of a collapsible chip conveyer according to an embodiment of the present invention in an opened position.

As shown in FIG. 1, a chip conveyer 11 is installed in the vicinity of a machining tool 12 such as a lathe. In front of the machining tool 12, a shooter 13 is provided for discharging chips generated during work processing by the machining tool 12. Immediately below this shooter 13, a support table 14 of the chip conveyer 11 is arranged and extends in the horizontal direction. The chip conveyer 11 includes a frame 21. The frame 21 has a plurality of frame members. Specifically, the frame 21 comprises a lower horizontal frame member 22 supported by the support table 14; an inclined frame member 23 connected to the lower horizontal frame member 22 and rising toward upper right in FIG. 1; and an upper horizontal frame member 22A connected to the upper end of the inclined frame member 23.

As shown in FIG. 1, a stay 15 is provided in the inclined frame member 23 and the stay 15 is connected by a coupling pin (not shown) to the inclined frame member 23 in a collapsible manner. A coupling link 16 is connected between the intermediate portion of the stay 15 and the inclined frame member 23. At the lower end of the stay 15, an adjustment bolt 17 is attached for adjusting the height.

At a proximal end (left end in FIG. 1) of the lower horizontal frame member 22, a pair of driven sprocket wheels 25 is arranged, and at the upper horizontal frame member 22A, a pair of drive sprocket wheels 28 are arranged and supported by a movable support shaft 27. Between the drive sprocket wheels 28 and the driven sprocket wheels 25, a caterpillar-shaped endless conveying member 26 is mounted to move clockwise as viewed in FIG. 1 for conveying chips. At the upper horizontal frame member 22A, a tension adjustment mechanism 29 is arranged for adjusting the horizontal position of the movable support shaft 27 and the drive sprocket wheels 28 to adjust the tension of the conveying member 26.

Moreover, on the upper horizontal frame member 22A, a drive mechanism 30 having a motor, a belt, and the like is mounted for rotating the movable support shaft 27 and the drive sprocket wheels 28 to move the conveying member 26.

Figures 2A, 2B:
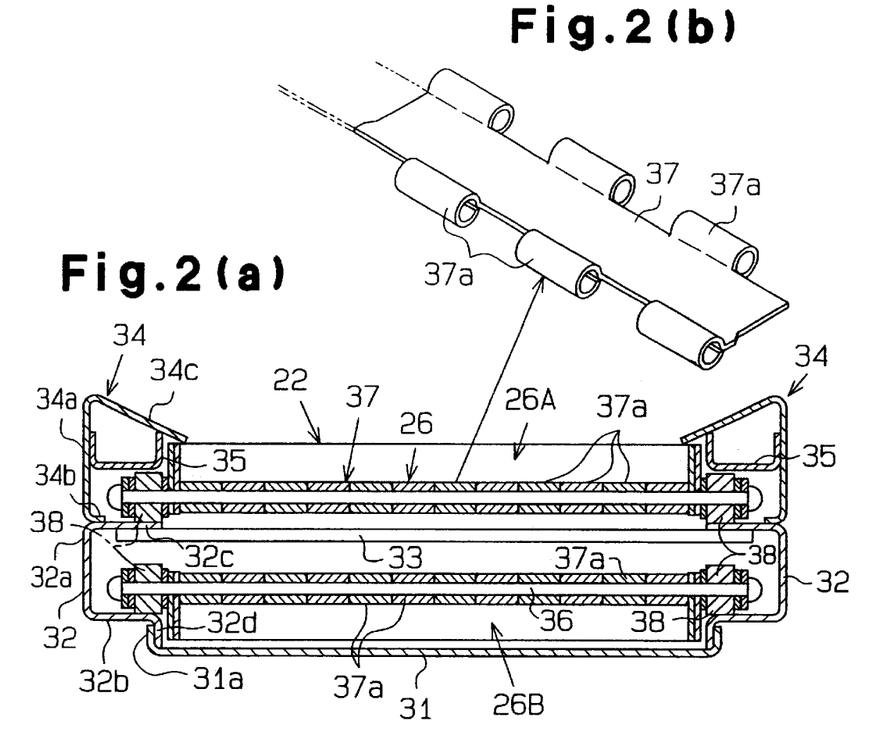
FIG. 2(a) is a cross sectional view taken along the line 2—2 of FIG. 1.
FIG. 2(b) is a perspective view of a shelf plate.

As shown in FIGS. 2(a) and 2(b), the lower horizontal frame member 22 comprises a bottom plate 31; a pair of lower guide rails 32 welded to a left and a right flange portion 31a of the bottom plate 31; and a connection bar 33 for connecting the lower guide rails 32. Moreover, the lower horizontal frame member 22 comprises a pair of upper guide rails 34 welded to the lower guide rails 32 and a channel-shaped floating prevention rails 35 welded in the upper guide rails 34.

Each of the lower guide rails 32 has a side plate 32a, a lower guide plate 32b, an upper guide plate 32c, and a flange portion 32d. The flange portion 32d is welded to the flange portion 31a of the bottom plate 31. The upper guide rail 34 has a side plate 34a, a flange portion 34b, and a cover portion 34c. The flange portion 34b is welded to the outer upper surface of the upper guide plate 32c and the cover portion 34c is integrally formed on the upper end edge of the side plate 34a in the inclined bending manner.

The conveying member 26 comprises a number of shelf plates 37; a plurality of connection shafts 36 for connecting the shelf plates 37; and a plurality of rollers 38 arranged on the connection shafts 36. At both sides of each of the shelf plates 37 are arranged shaft cylinder portions 37a at a distance, like comb teeth. The shaft cylinder portions 37a are connected by the connection shaft 36 so that the shelf plates 37 are connected to each other. Rollers 38 are supported at both ends of each of the connection shafts 36.

The respective rollers 38 of the forward portion 26A of the conveying member 26 are guided along the upper surface of the upper horizontal guide plate 32c of the lower guide rail 32 and its floating up is prevented by the floating prevention rail 35. Moreover, the respective rollers 38 of the return portion 26B of the conveying member 26 are guided along the upper surface of the lower guide plate 32b of the lower guide rail 32.

Figure 3:
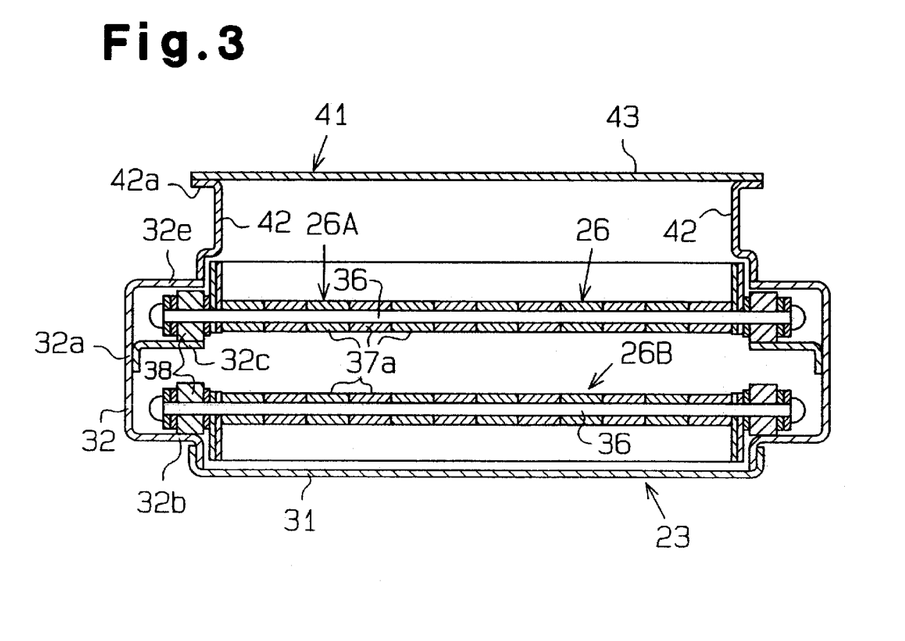
FIG. 3 is a cross sectional view taken along the line 3—3 of FIG. 1.

As shown in FIG. 3, at the inclined frame member 23, a cover 41 is arranged instead of the cover portion 34c of the upper guide rail 34 of the lower horizontal frame member 22. At the upper portion of the lower guide rail 32, a floating prevention rail 32e is integrally formed by bending that upper portion. On the upper surface of this rail 32e, a lower end edge of the side plate constituting the cover 41 is welded and to a flange portion 42a arranged on the upper end of the side plate 42 is detachably attached a top plate 43 constituting the cover 41 by means of a screw or the like.

In this embodiment, as shown in FIG. 1, the lower horizontal frame member 22 is divided at a part near the inclined frame member 23 along its width direction. Accordingly, the lower horizontal frame member 22 is separated into two separation portions: a first horizontal portion 22a occupying most of the lower horizontal frame member 22 and a second horizontal portion 22b occupying the remainder of the lower horizontal frame member 22. The second horizontal portion 22b is connected to the inclined frame member 23. The first horizontal portion 22a forms a first separation portion. The second horizontal portion 22b and the inclined frame member 23 form a second separation portion.

Between the first and second horizontal portions 22a and 22b of the lower horizontal frame member 22, a hinge mechanism 51 is mounted for connecting the first and second separation portions in a collapsible manner. Since this hinge mechanism 51 is arranged symmetrically at the right and left sides of the lower horizontal frame member 22 viewed on a plan view, explanation will be given on the hinge mechanism 51 of one side with reference to FIG. 4 to FIG. 7 and explanation on the hinge mechanism of the other side will be omitted.

Figure 7:
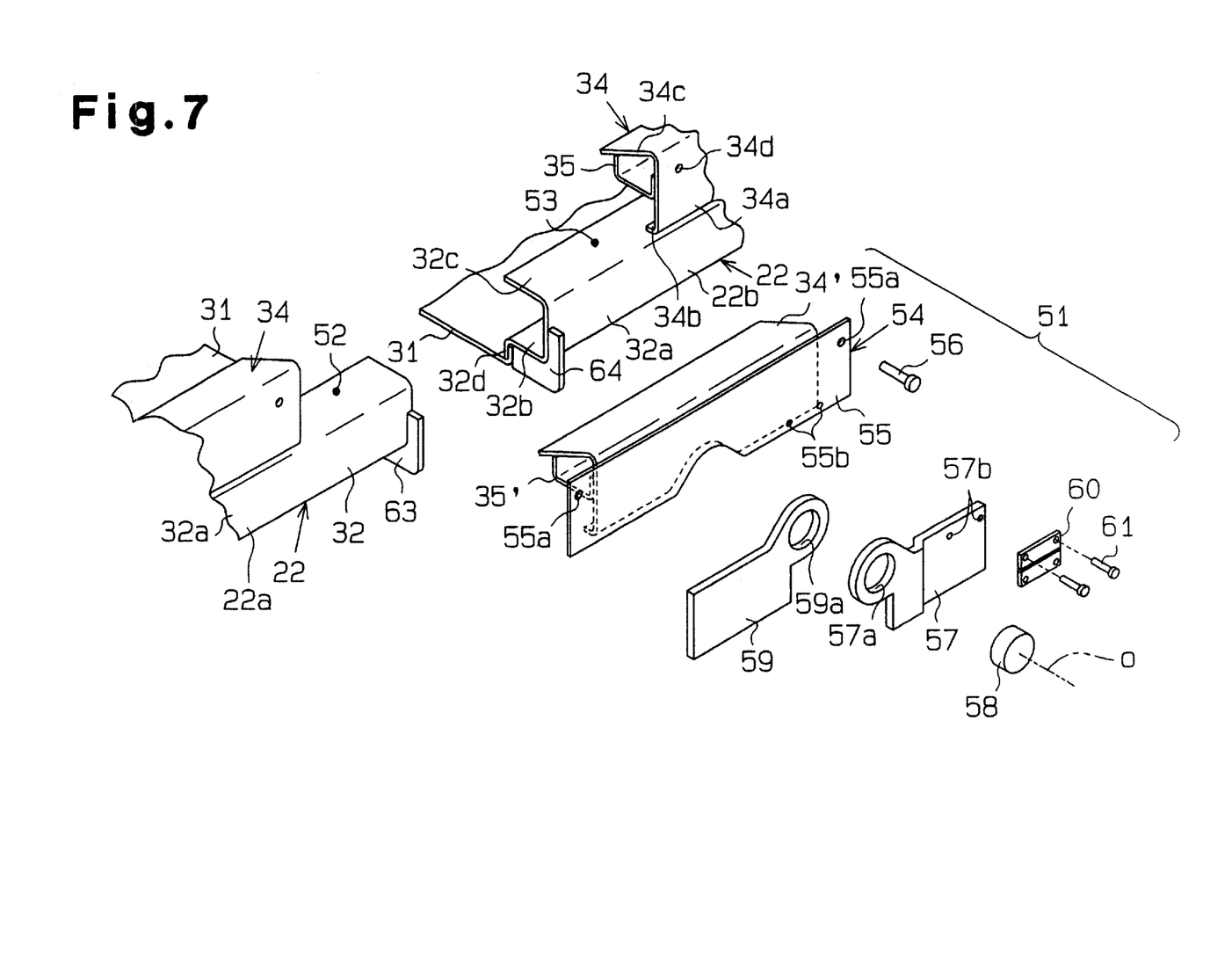
FIG. 7 is an exploded perspective view of the hinge mechanism.

As shown in FIG. 7, in the first and second horizontal portions 22a and 22b of the lower horizontal frame member 22, the lower guide rail 32 is separated into two portions so as to be matched with each other. In the upper guide rail 34, a predetermined length in the longitudinal direction of the rail 34 is removed, so as to form first and second gaps 52, 53 for allowing the lower horizontal frame member 22 to rotate toward the inclined frame member 23. The first and second gaps 52 and 53 are set in the first and second horizontal portions 22a and 22b.

A cover 54 is mounted on the lower horizontal frame member 22. To correspond to the first and second gaps 52 and 53, the cover 54 is formed with an attachment substrate 55 and filling guide rails 34' and 35' that fill the first and second gaps 52, 53 and are welded to an inner surface of the substrate 55. The attachment substrate 55 has two holes 55a. Bolts 56 inserted into the holes 55a are screwed in a threaded hole 34d formed in the upper guide rail 34, thereby positioning the filling guide rails 34' and 35' in the first and second gaps 52 and 53.

Figure 6:
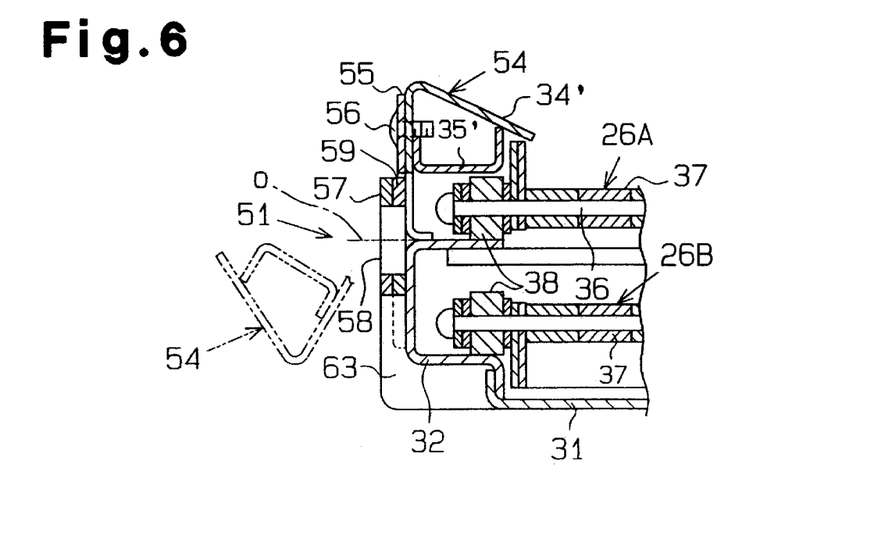
FIG. 6 is a cross sectional view taken along the line 6—6 of FIG. 4.

A first bearing 57 consisting of a plate material is welded to the side plate 32a of one separation end of the lower guide rail 32. Moreover, a second bearing 59 consisting of a plate material is also welded to the side plate 32a of the other separation end of the lower guide rail 32. Ring portions 57a and 59a are integrally formed at the tip end of the bearings 57 and 59. A coupling pin 58 is fixed by welding or the like to the first ring portion 57a and the end portion of the coupling pin 58 is rotatably inserted into the second ring portion 59a. As shown in FIG. 6, the center of the coupling pin 58, i.e., the rotation axis O of the lower horizontal frame member 22, is set between the forward portion 26A and return portion 26B of the conveying member 26. The rotation axis O is desirably set at the center of the aforementioned interval.

The cover 54 is attached to the first bearing 57 via a hinge 60 such that the cover 54 can be set to a working position and a retrieval position. The hinge 60 is fixed by a pair of screws 61 in a pair of threaded holes 57b formed on the first bearing 57 and by a pair of screws 61 in a pair of threaded holes 55b formed on the attachment substrate 55 of the cover 54.

A first and a second position regulating plate 63 and 64 are welded to the two separated end edges of the lower guide rail 32. The first and the second position regulating plates 63 and 64 reinforce the separated end edges of the lower guide rail 32 to be matched with each other in the horizontal opened position of the lower horizontal frame member 22 as shown in FIG. 1.

Next, explanation will be given on operation of the collapsible chip conveyer having the aforementioned configuration.

FIG. 1 shows the chip conveyer 11 installed at a predetermined position so as to be usable. In this state, when the drive mechanism 30 is actuated to rotate the movable support shaft 27 and the drive sprocket wheel 28, the conveying member 26 moves along the lower guide plate 32b and the upper guide plate 32c of the lower horizontal frame member 22 and the inclined frame member 23. Chips falling from the shooter 13 of the machining tool 12 on the forward portion 26A of the conveying member 26 are conveyed to the right end of the lower horizontal frame member 22 in FIG. 1, and then are carried to the inclined frame member 23 and into the cover 41. After this, the chips are made to fall from a discharge port 72 of the upper horizontal frame member 22A and collected in a recovery box (not shown). The conveying member 26, which has finished discharge of the chips, returns to the lower horizontal frame member 22 by the return portion 26B and then inverted around the fixed support shaft 24 to reach the forward portion 26A and to convey chips again.

Figure 4:
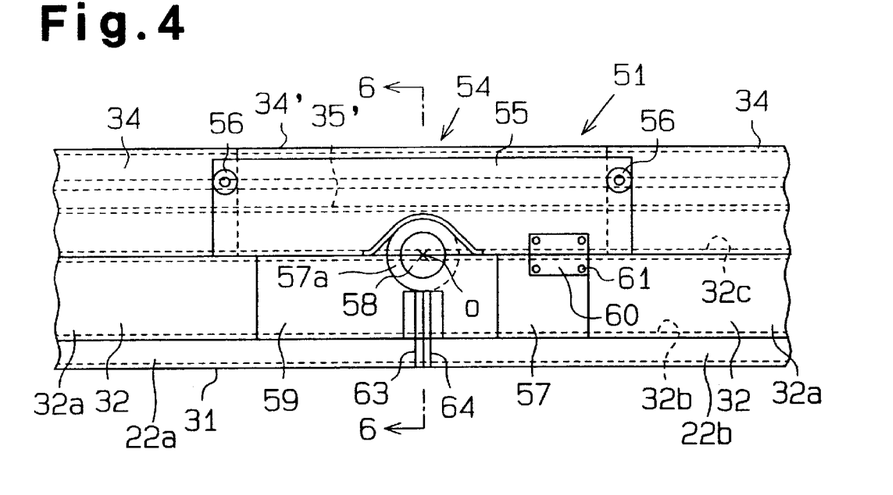
FIG. 4 is a front view of a hinge mechanism.
Figure 5:
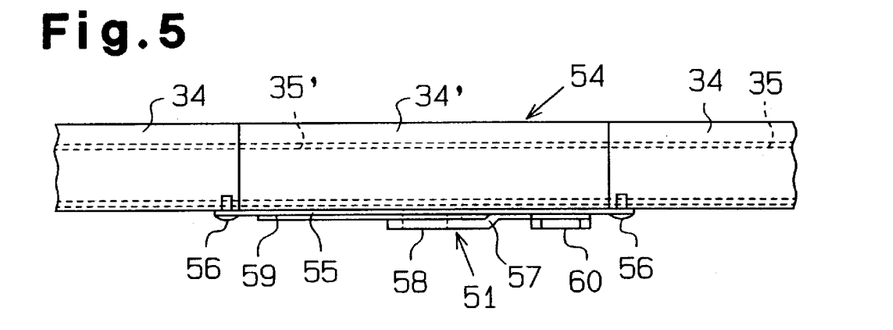
FIG. 5 is a plan view of the hinge mechanism.
Figure 8:
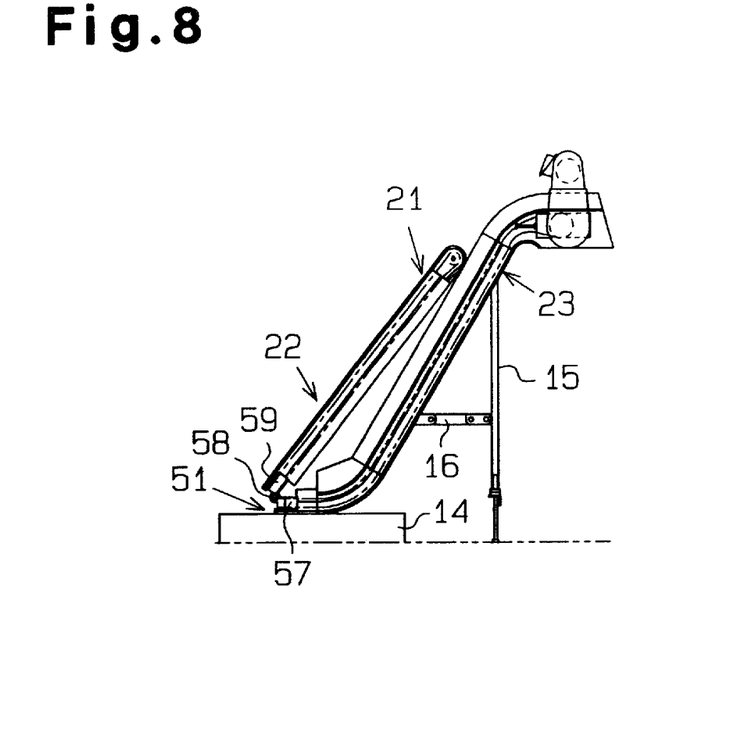
FIG. 8 is a front view of the chip conveyer in a collapsed position.
Figure 9:
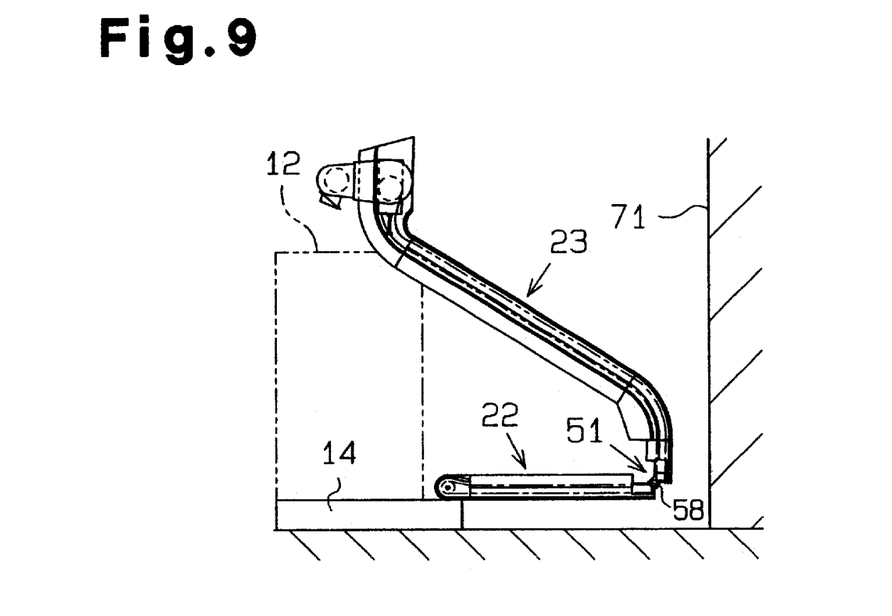
FIG. 9 is a front view of the chip conveyer in a collapsed position during an installation work.

FIG. 4 to FIG. 6 show the state in which the attachment substrate 55 of the hinge mechanism 51 is fixed to the side plate 34a of the upper guide rail 34 by a pair of bolts 56. In this state, when the pair of bolts 56 are removed from the threaded hole 34d, the cover 54 can be opened at the side around the hinge 60. When the cover 54 is rotated from the working position (indicated by a solid line) to a retrieval position (indicated by a dotted line), the filling guide rail 34' is disengaged from the first and the second gaps 52 and 53, and the cover 54 is held at the side of the bearing 57 and the bearing 59. In this state, the first and second gaps 52 and 53 are opened. Accordingly, by rotating the lower horizontal frame member 22 or the inclined frame member 23 around the coupling pin 58, as shown in FIG. 8 or FIG. 9, it is possible to collapse the chip conveyer.

Explanation will now be given on effects of the collapsible chip conveyer having the aforementioned configuration.

(1) The lower horizontal frame member 22 is separated at a part near the inclined frame member 23 along the width direction. At the separation ends of the lower horizontal frame member 22 (the first and the second separation portion 22a and 22b), the upper guide rail 34 is partially cutout to form the first and the second gap 52 and 53. A pair of matching ends of the lower guide rail 32 is connected by the hinge mechanism 51. Furthermore, the rotation axis O of the coupling pin 58 of the hinge mechanism 51 is set at the center position between the forward portion 26A and the return portion 26B of the conveying member 26, and the first and second gaps 52 and 53 are filled by the filling guide rails 34' and 35' of the cover 54. Accordingly, there is no need of differentiating the width of the lower horizontal frame member 22 and the inclined frame member 23. Thus, it is possible to easily produce the lower horizontal frame member 22 and to minimize the width of the lower horizontal frame member 22, thereby lowering the material cost.

(2) Since the first and second gaps 52 and 53 are shielded by the cover 54 when the chip conveyer 11 is in a working state, external view will not be deteriorated. Furthermore, since the cover 54 has filling guide rails 34' and 35' for filling the discontinuous portion of the upper guide rail 34, it is possible to smoothly move the conveying member 26.

(3) As shown in FIG. 8, the two separation portions can be collapsed so that the inclined frame member 23 is almost to a state parallel to the lower horizontal frame member 22. In this case, the first and second gaps should be formed in a prolonged form. However, since the filling guide rails 34' and 35' are present, there is no trouble of external view or the movement of the conveying member 26.

(4) Since the lower horizontal frame member 22 can be arranged almost parallel to the inclined frame member 23, it is possible to reduce the volume of the collapsed chip conveyer 11 in its folded state and to reduce the package volume of the chip conveyer, thereby facilitating packaging work and carrying work by truck or ship. This significantly reduces the package and transportation costs.

Moreover, as shown in FIG. 9, it is possible to rotate the separation portion having the inclined frame member 23 counterclockwise while maintaining the other separation portion (having most of the lower horizontal frame member 22) in the horizontal positioning. Accordingly, even when only a small space is present between the machining tool 12 and a wall 71 of a factory building, the collapsible chip conveyer can be easily stored prior to installation.

(5) With respect to the bearing 57, the cover 54 for the first and second gaps 52 and 53 is connected to the lower horizontal frame member 22 by the hinge 60. Accordingly, there is no need of separating the cover 54 from the lower horizontal frame member 22 and there is no trouble of losing the cover 54.

(6) The position regulating plates 63 and 64 are welded to the first and second horizontal portions 22a, 22b, respectively. Accordingly, when the two separation portions are opened via the hinge mechanism 51, the position regulating plates 64 and 63 are brought into contact with each other and it is possible to keep stably the state of the horizontal arrangement of the lower horizontal frame member 22.

(7) Since the stay 15 is constituted to be opened and closed with respect to the inclined frame member 23, it is possible to be collapsed into a small volume. Thus, it is possible to reduce the package volume of the chip conveyer 11 and reduce the transportation cost.

(8) Since the two separation portions can be collapsed without removing the conveying member 26 from the frame 21, there is no need of attaching and detaching the conveying member 26. This also eliminates necessity of tension adjustment work of the conveying member accompanying the attachment and detachment, thereby easily performing installation.

Next, explanation will be given on the effect concerning the package volume of the chip conveyer 11.

When the chip conveyer 11 has entire length of 2.943 m, height of 1.811 m and width of 0.60 m, the package volume will be 1.811 m×2.943 m×0.60 m=3.20 m³ if packaged in a non-collapsed, opened position as shown in FIG. 1.

Figure 10:
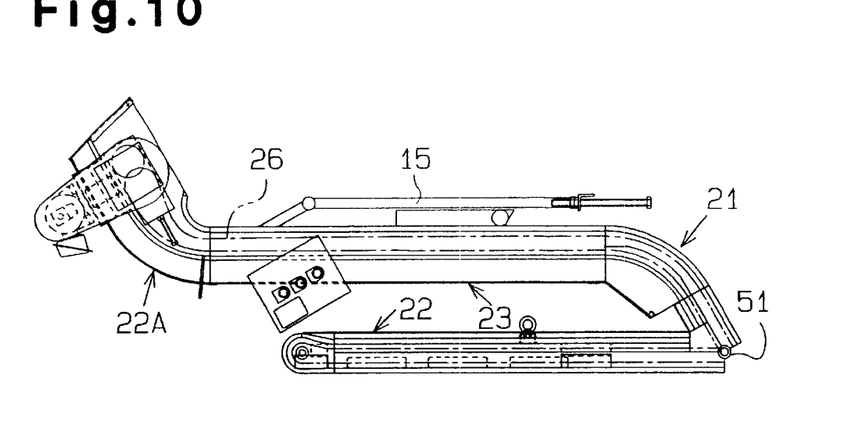
FIG. 10 is a front view of the chip conveyer collapsed into the minimum state.
Figure 11:
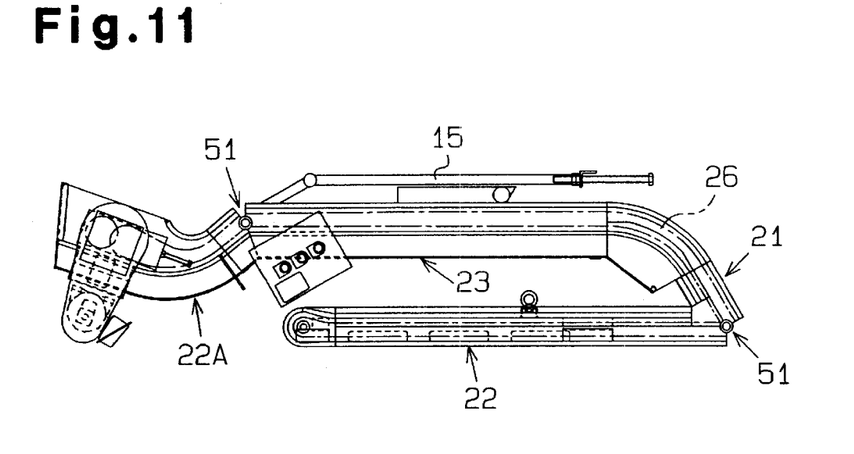
FIG. 11 is a front view of the chip conveyer collapsed through two hinge mechanisms.

On the other hand, in the collapsed position shown in FIG. 8, the entire length is reduced and the package volume is 1.811 m (height)×1.641 m (length)×0.6 m (width)=1.78 m³. As shown in FIG. 10, when the stay 15 is further collapsed, the package volume has become 0.842 m (height)×2.166 m (length)×0.6 m (width)=1.09 m³. Furthermore, as shown in FIG. 11, when the hinge mechanism 51 is added to the connection portion between the inclined frame member 23 and the upper horizontal frame member 22A and the upper horizontal frame member 22A is collapsed, the package volume has become 0.541 m (height)×2.166 m (length)×0.6 m (width)=0.70 m³.

As is clear from the aforementioned fact, the chip conveyer package volume can be reduced by about 22% to 55% when comparison is made between the case where the chip conveyer 11 is used in an opened position and the case where the conveyer 11 is gradually collapsed in the packaging operation, thereby significantly reducing the package and transportation cost.

It should be noted that the chip conveyer of the aforementioned embodiment can be modified as follows.

Figure 12:
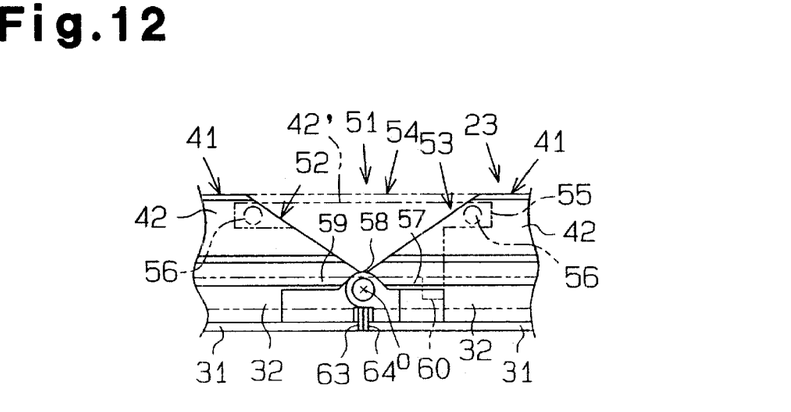
FIG. 12 is a front view showing another example of the hinge mechanism.
Figure 13:
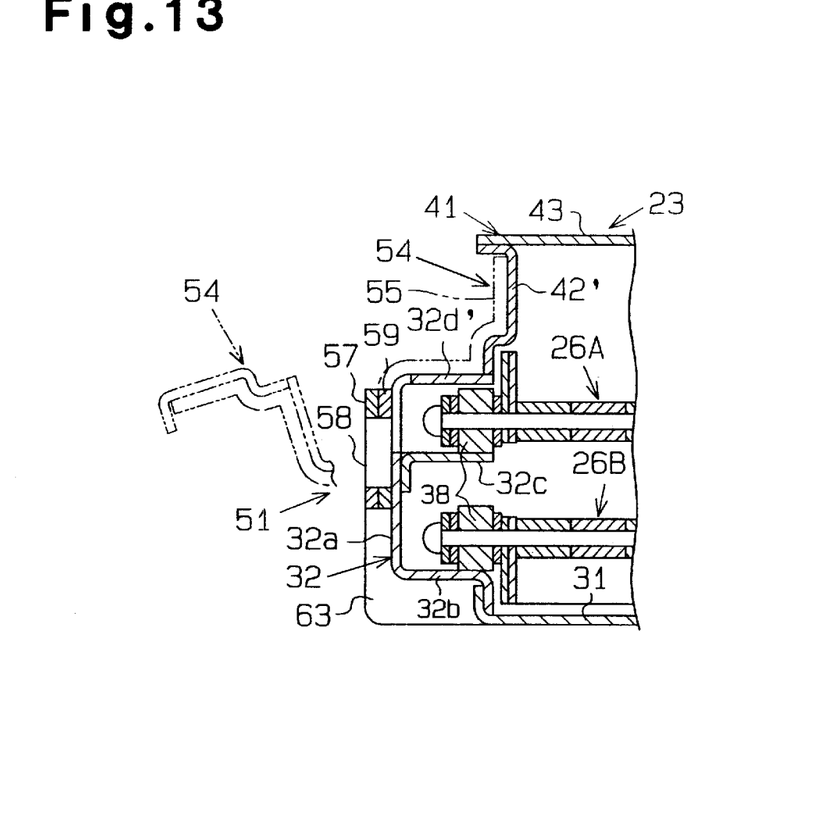
FIG. 13 is a cross sectional view of the hinge mechanism of FIG. 13.

As shown in FIG. 12 and FIG. 13, the inclined frame member 23 may be separated into two portions along the separation line extending in the width direction and the hinge mechanism may be attached to the separation portions. In this case, almost upper half of the side plate 42 and the lower guide rail 32 constituting the cover 41 is removed in the inclined manner so as to form the first and second gaps 52 and 53, and the cover 54 is mounted on the bearing 57 so as to be opened and closed toward the side direction, thereby filling the gaps 52 and 53.

To the attachment substrate 55 attached to the bearing 57 via the hinge 60, there are attached a filling flange portion 32d' and a filling side plate 42' for filling the gap of the flange portion 32d of the lower guide rail 32 and the gap of the side plate 42. When the cover 54 is rotated around the hinge 60 with the top plate 43 removed from the side plate 42, as shown by a dotted line in FIG. 13, the cover 54 is switched from the working position to the retrieval position. Thus, it is possible to collapse the inclined frame member 23 to the side of the lower horizontal frame member 22.

In this example, it is possible to collapse the two separation portions so that the inclined frame member 23 is in almost parallel state to the lower horizontal frame member 22 and to reduce the volume of the chip conveyer 11.

Figure 14:
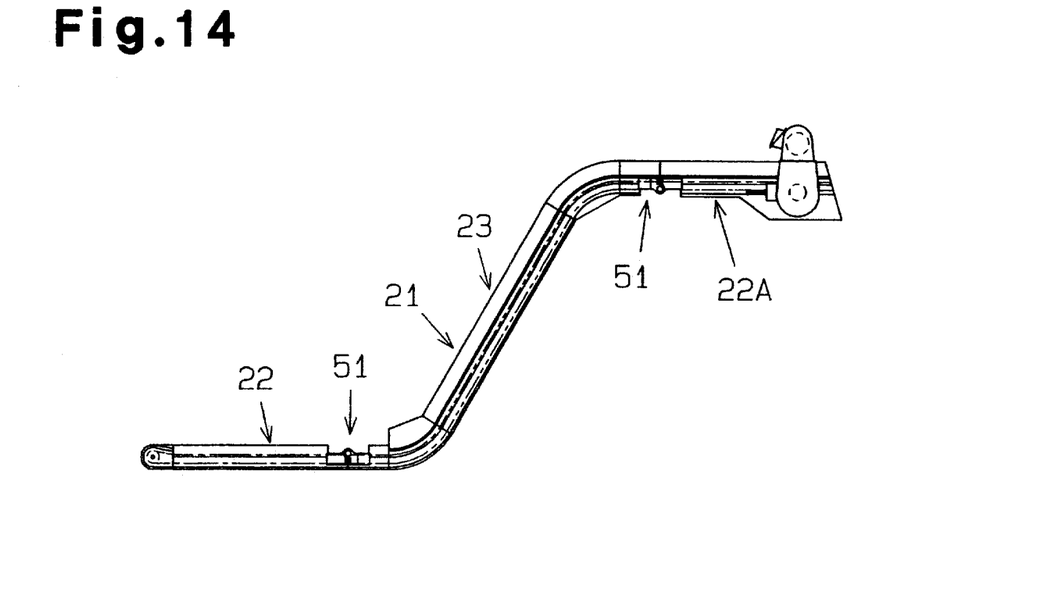
FIG. 14 is a front view showing another example of the chip conveyer in an opened position.
Figure 15:
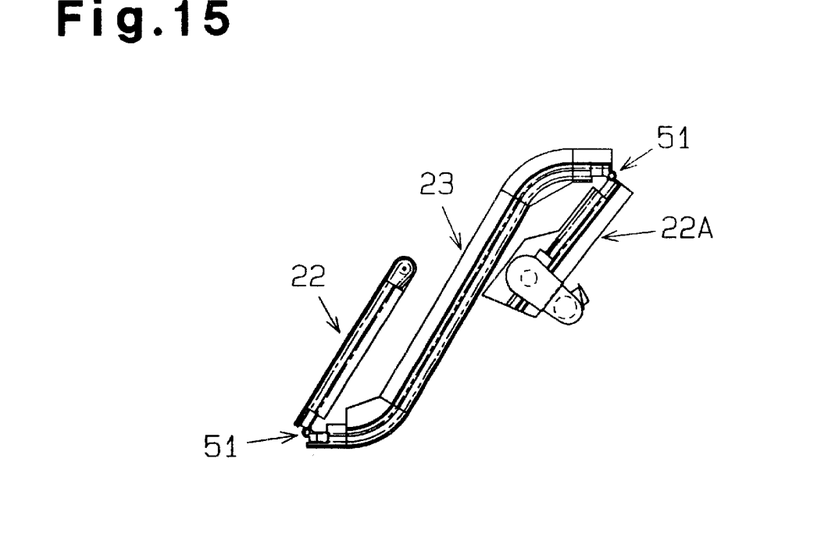
FIG. 15 is a front view of the chip conveyer of FIG. 14 in a collapsed position.

In another example shown in FIG. 14, the hinge mechanism 51 is also provided at the intermediate portion of the long upper horizontal frame member 22A. Accordingly, as shown in FIG. 15, it is possible to collapse not only the lower horizontal frame member 22 but also the upper horizontal frame member 22A to the side of the inclined frame member 23. Thus, it is possible to pack a large-size chip conveyer in a small package, facilitating transportation.

Figure 16:
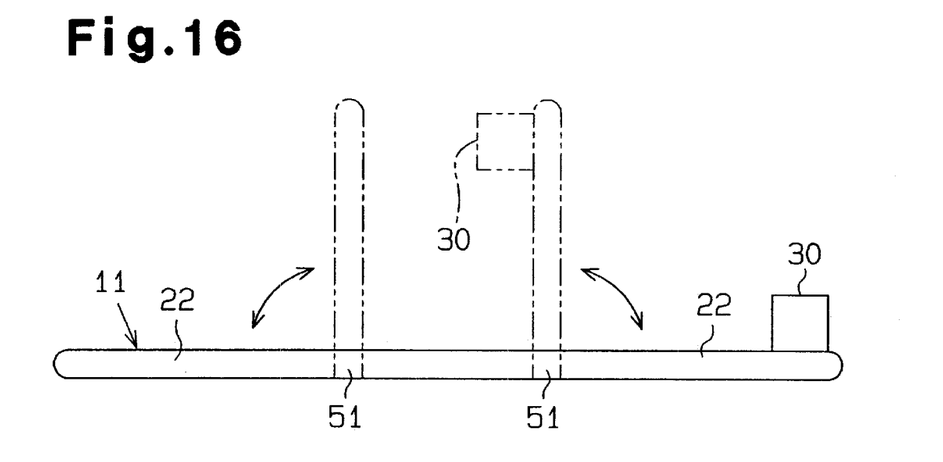
FIG. 16 is a schematic front view showing still another example of the chip conveyer.

As shown in FIG. 16, the hinge mechanism 51 may be provided at two positions at the center portion of the lower horizontal frame member 22, so that the lower horizontal frame member 22 can be collapsed such that they extend in parallel to each other.

Conventionally, the chip conveyer having a long frame in the horizontal direction is divided into three portions and the conveying member is removed from the frame when transported. Accordingly, it is possible to make the package volume small. However, in the factory where the chip conveyer 11 is used, it is necessary to connect the separated frame members and attach the conveying member and adjust tension of the conveying member by using the tension adjustment mechanism, which is very troublesome. In contrast to this, in the example of FIG. 16, the aforementioned problems can be eliminated.

Figure 17:
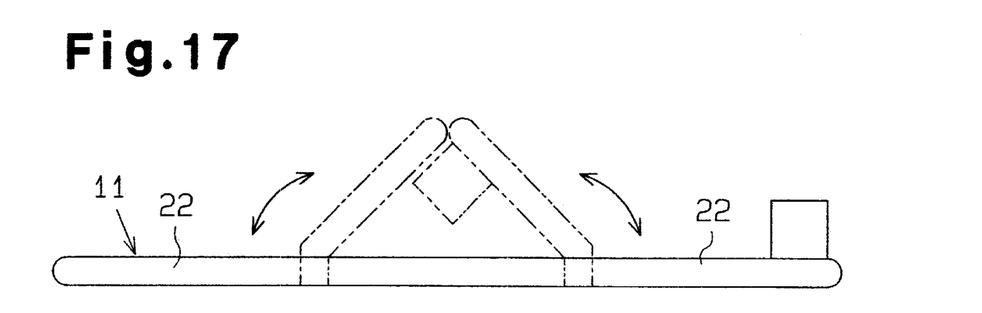
FIG. 17 is a schematic front view showing yet another example of the chip conveyer.

As shown in FIG. 17, the lower horizontal frame member 22 may be divided into three equal portions and the hinge mechanism 51 is provided at two positions, so that the lower horizontal frame member 22 can be collapsed into a triangle form.

Although not shown in the drawing, the bearings 57 and 59 may be detachably attached to the lower guide rail 32 by a bolt. Moreover, the cover 54 may be attached to the threaded hole 34d of the upper guide rail 34 with a bolt 56 instead of connecting the cover 54 to the bearing 57.

The filling guide rails 34' and 35' of the cover 54 covering the gaps 52 and 53 may be omitted. In this case, since the guide rail of the conveying member 26 is partially removed, the first and second gaps 52 and 53 are preferably set in short size.

The rotation axis O of the hinge mechanism 51 may be set at an arbitrary position between the forward portion 26A and the return portion 26B of the conveying member 26.

The cover 54 may be connected to separation end of the lower horizontal frame member 22 or the inclined frame member 23 or the member constituting the hinge mechanism 51 such that switching can be performed between the working position covering the gaps 52 and 53 and the retrieval position.

The hinge mechanism 51 may be provided at three or more positions on the frame 21.

One of the gaps 52 and 53 may be omitted. In this case, the remaining gap should be of a large size.

Therefore, the present examples and embodiments are to be considered as illustrative and not restrictive and the invention is not to be limited to the details given herein, but may be modified within the scope and equivalence of the appended claims.

What is claimed is:

1. A collapsible chip conveyer having a frame, a guide rail, and an endless conveying member, wherein the conveying member has a forwarding portion and a return portion and travels along the guide rail in the frame, wherein the conveying member receives chips discharged from a machining tool at a receiving position set on the forwarding portion, conveys the chips to a discharge position, and then discharges the chips from the discharge position, wherein the conveyer comprises:
    a plurality of separation portions, each of which includes a part of the guide rail and a part of the frame;
    a hinge mechanism having a rotation axis, which is located between the forwarding portion and the return portion of the conveying member, wherein the hinge mechanism couples two separation portions such that the coupled separation portions pivot about the rotation axis between a collapsed position and an opened position; and
    a cover, which is detachably mounted on the frame;

wherein, when the coupled separation portions are located at the opened position, the coupled separation portions contact each other at one of the forwarding portion and the return portion of the conveying member while forming a gap at the other portion, and the cover covers the gap, and wherein, when the coupled separation portions are located at the collapsed position, the cover is detached from the frame.

2. The collapsible chip conveyer according to claim 1, wherein the rotation axis of the hinge mechanism is set at a midpoint between the forwarding portion and the return portion of the conveying member.

3. The collapsible chip conveyer according to claim 1, wherein the cover is switched between a working position for covering the gap and a retrieval position.

4. The collapsible chip conveyer according to claim 3, wherein the separation portions comprise a first separation portion and a second separation portion, which are located adjacent to each other, wherein the first separation portion is a first horizontal portion, wherein the second separation portion includes a second horizontal portion and an inclined frame member, wherein the first and second horizontal portions extend horizontally when the first and second coupled separation portions are at the opened position, and wherein the inclined frame member extends upwards from the second horizontal portion;

wherein the hinge mechanism includes a first bearing fixed to the second horizontal portion, a second bearing fixed to the first horizontal portion, and a coupling pin for pivotally coupling the first and second bearings to each other.

5. The collapsible chip conveyer according to claim 4, wherein the cover is mounted on one of the first and second bearings.

6. The collapsible chip conveyer according to claim 1, wherein the gap is formed on the guide rail, and wherein the cover has a filling guide rail for filling the gap of the guide rail.

7. The collapsible chip conveyer according to claim 1, wherein the frame includes a horizontal frame member and an inclined frame member extending upward from the horizontal frame member, and the hinge mechanism is arranged on the horizontal frame member near the inclined frame member and the inclined frame member.

8. The collapsible chip conveyer according to claim 1, wherein, when the separation portions are at the collapsed position, the gap permits the separation portions to be stacked in a substantially parallel state.

9. The collapsible chip conveyer according to claim 7, wherein a stay is attached to the inclined frame member, and wherein the stay is collapsible toward the inclined frame member.

10. The collapsible chip conveyer according to claim 7, wherein the hinge mechanism is arranged such that the horizontal frame member does not interfere with the inclined frame member when the separation portions are collapsed toward each other.

11. The collapsible chip conveyer according to claim 1, wherein the frame includes a lower horizontal frame member, an inclined frame member extending upward from the lower horizontal frame member, and an upper horizontal frame member extending from the inclined frame member, and wherein the hinge mechanism includes two members, wherein one of the hinge mechanism members is located on the lower horizontal frame member at a position near the inclined frame member, the other hinge mechanism member is located on the upper horizontal frame member at a position near the inclined frame member.

12. A collapsible chip conveyer having a frame, a guide rail, and an endless conveying member, wherein the conveying member has a forwarding portion and a return portion and travels along the guide rail in the frame, wherein the conveying member receives chips discharged from a machining tool at a receiving position set on the forwarding portion, conveys the chips to a discharge position, and discharges the chips from the discharge position, wherein the conveyer comprises:
a plurality of separation portions, each of which includes a part of the guide rail and a part of the frame, wherein the frame includes a horizontal frame member and an inclined frame member extending upward from the horizontal frame member,
a hinge mechanism having a rotation axis, which is located between the forwarding portion and the return portion of the conveying member, wherein the hinge mechanism couples the separation portions such that the separation portions pivot about the rotation axis between a collapsed position and an opened position, and wherein the hinge mechanism is located on the horizontal frame member at a position in the vicinity of the boundary between the horizontal frame member and the inclined frame member;
wherein, when at the opened position, the separation portions contact each other at one side of the hinge mechanism while forming a gap at the other side of the hinge mechanism; and
a cover, which is detachably mounted on the frame to cover the gap, wherein, when the separation portions are located at the collapsed position, the cover is detached from the gap.

13. The collapsible chip conveyer according to claim 12, wherein the rotation axis of the hinge mechanism is set at a midpoint between the forwarding portion and the return portion of the conveying member.

14. The collapsible chip conveyer according to claim 12, wherein the cover is switched between a working position for covering the gap and a retrieval position.

15. The collapsible chip conveyer according to claim 12, wherein the hinge mechanism includes a first bearing, a second bearing, and a coupling pin for pivotally coupling the first and second bearings to each other.

16. The collapsible chip conveyer according to claim 15, wherein the cover is mounted on one of the first and second bearings.

* * * * *